(12) United States Patent
Fujii et al.

(10) Patent No.: US 6,263,734 B1
(45) Date of Patent: Jul. 24, 2001

(54) PIEZOELECTRIC ACCELERATION SENSOR AND METHOD OF DETECTING ACCELERATION AND MANUFACTURING METHOD THEREOF

(75) Inventors: Satoru Fujii, Takatsuki; Isaku Kanno, Yamatokohriyama; Takeshi Kamada, Nara; Ryoichi Takayama, Suita, all of (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/289,936

(22) Filed: Apr. 13, 1999

(30) Foreign Application Priority Data

Apr. 13, 1998 (JP) .................................................. 10-100777
Mar. 11, 1999 (JP) .................................................. 11-064733

(51) Int. Cl.[7] ...................................................... G01P 15/09
(52) U.S. Cl. .................................................... 73/514.34
(58) Field of Search ........................... 73/514.34, 514.16, 73/514.29, 514.01, 510; 310/311, 328, 329, 330, 340, 344, 368

(56) References Cited

U.S. PATENT DOCUMENTS

| 5,679,896 | * | 10/1997 | Nakamura et al. | ................. | 73/514.34 |
| 5,734,107 | * | 3/1998 | Boehm et al. | ..................... | 73/514.34 |
| 5,959,209 | * | 9/1999 | Takeuchi et al. | .................. | 73/514.34 |
| 5,983,722 | * | 11/1999 | Berther et al. | ..................... | 73/514.34 |
| 5,996,412 | * | 12/1999 | Hansen | ............................. | 73/514.34 |

FOREIGN PATENT DOCUMENTS

| 63-9673 | 3/1988 | (JP) . |
| 5-180864 | 7/1993 | (JP) . |
| 5-270912 | 10/1993 | (JP) . |
| 9-298327 | 11/1997 | (JP) . |

\* cited by examiner

Primary Examiner—Helen Kwok
(74) Attorney, Agent, or Firm—Parkhurst & Wendel, LLP

(57) ABSTRACT

An acceleration sensor 201 comprises a longitudinal effect type detection unit 203 and a lateral effect type detection unit 204. The longitudinal effect type detection unit 203 comprises a longitudinal effect type piezoelectric element 211 comprising a piezoelectric body 211a of a thin film, an electrode 211b and an electrode 211c, which is formed on a deposition substrate 221 serving also as a weight. The lateral effect type detection unit 204 is constituted by providing a lateral effect type piezoelectric element 213 comprising a piezoelectric body 213a of a thin film, an electrode 213b and an electrode 213c, which is formed on the deposition substrate 221 and is cantilevered above a groovy recessed part 105a on a substrate 105. A detection circuit 116 detects an acceleration in a predetermined direction, based on an output of both the longitudinal effect type detection unit 203 and the lateral effect type detection unit 204. Consequently, it is possible to detect an acceleration in a predetermined direction and to make a wider dynamic range and a wider band.

22 Claims, 14 Drawing Sheets

PIEZOELECTRIC ACCELERATION SENSOR AND METHOD OF DETECTING ACCELERATION AND MANUFACTURING METHOD THEREOF

BACKGROUND OF THE INVENTION (1) Field of the Invention

The present invention relates to a piezoelectric acceleration sensor for detecting acceleration, shock and vibration by using a piezoelectric body, and a method of detecting acceleration, and a manufacturing method thereof.

(2) Description of the Prior Arts

In recent years, dielectrics, particularly ferroelectrics, has been studied as a key material of piezoelectric elements such as an acceleration sensor (piezoelectric acceleration sensor) and a pressure sensor utilzing piezoelectric, an actuator utilizing reverse piezoelectric effect as well as a pyroelectric infrared detector using pyroelectric, a nonvolatile memory using polarization inversion, a capacitive element using a characteristic of high permittivity.

A piezoelectric element used for the above-mentioned acceleration sensor and a pressure sensor detects mechanical values (acceleration, pressure and the like) by utilzing 'piezoelectric effect' in which a piezoelectric body generates electric charge by the addition of force to a piezoelectric body, and has a characteristic of obtaining an extremely high detectivity.

The above-mentioned acceleration sensor is described below in detail. Since acceleration, shock and vibration are a similar phenomenon physically, these are chiefly named acceleration generically below.

An acceleration sensor is classified into the following three kinds of types by a direction of detecting a force (acceleration) which acts on a piezoelectric body.

(1) longitudinal effect type: detects an acceleration in a direction parallel with an electrical axis
(2) shear effect type: detects an acceleration in a direction wherein a gap in a plane parallel with an electrical axis occurs
(3) lateral effect type: detects an acceleration in a direction vertical to an electrical axis The above-mentioned longitudinal effect type acceleration sensor is constituted by providing a weight at the end of a piezoelectric body, and utilizes the occurrence of electric charge in the piezoelectric body when the piezoelectric body expands and contracts by the inertia of the weight. This acceleration sensor can detect a large acceleration because of a high mechanical strength. Moreover, generally, the acceleration sensor can detect a vibration with a high frequency and an acceleration which changes abruptly because of a high mechanical resonance frequency.

A shear effect type acceleration sensor has the same structure as the above-mentioned longitudinal effect type, and utilizes the occurrence of electric charge in a piezoelectric body when shear force acts on the piezoelectric body by the inertia of the weight. This acceleration sensor also can detect a large acceleration as well as a vibration with a high frequency and an acceleration which changes abruptly, similarly to the longitudinal effect type.

Meanwhile, a lateral effect type acceleration sensor is constituted by sticking a piezoelectric body on an elastic plate with the structure of a cantilever or a fixed beam at both ends, and can detect a minute acceleration because of a high sensitivity. Moreover, generally, the acceleration sensor easily detects a vibration with a low frequency and an acceleration which changes gently since it is easy to lower a mechanical resonance frequency.

However, the above-mentioned longitudinal effect type acceleration sensor detects not merely an acceleration in a direction parallel with an electrical axis, but also an acceleration in a direction, wherein a gap in a plane parallel with an electrical axis occurs at a weight, by the same principle as a shear effect type. Consequently, it is difficult to decide through output voltage an acceleration in which direction acts, and the problem is that it is impossible to detect only an acceleration in a direction parallel with an electrical axis accurately. It is possible to detect a large acceleration, while it is difficult to detect a minute acceleration.

Meanwhile, generally, a lateral effect type acceleration sensor has such a problem that it is difficult to detect a vibration with a high frequency and an acceleration which changes abruptly because of a comparatively low mechanical resonance frequency. Since a piezoelectric body is stuck on an elastic plate and an acceleration is detected indirectly according to a deformation of the piezoelectric body following a flexure of the elastic plate, a dispersion in the sensitivity of the sensor tends to get larger when the elastic plate and the piezoelectric body are incompletely stuck in a manufacturing process or a dispersion occurs in a state of sticking.

SUMMARY OF THE INVENTION

The present invention is intended for providing a piezoelectric acceleration sensor, which can detect an acceleration in a predetermined direction certainly, in view of the above-mentioned regard. Moreover, it is intended for providing a piezoelectric acceleration sensor which can detect a large acceleration and a minute acceleration (make a wider dynamic range) as well as a vibration with a high frequency and with a low frequency, and an acceleration with an abrupt change and with a gentle change (make a wider band). Furthermore, it is intended for providing a piezoelectric acceleration sensor which can restrain a dispersion in detectivity and intend downsizing, lightness in weight and the reduction of manufacturing costs.

Moreover, the present invention is intended for providing a method of detecting an acceleration by using the above-mentioned piezoelectric acceleration sensor.

In addition, the present invention is intended for providing a method of manufacturing the above-mentioned piezoelectric acceleration sensor.

First, a summary of the present invention which attains the above-mentioned purposes is described. The present invention has a basic principle of detecting an acceleration in a predetermined direction and intending to make a wider dynamic range and a wider band tough the composition and the operation of a signal based on an output from a plurality of the sensors by using a piezoelectric acceleration sensor comprising a plurality of piezoelectric elements. More specifically, for instance, it is possible to detect an acceleration in a predetermined direction certainly by providing a plurality of piezoelectric elements having anisotropy in a direction of detecting an acceleration component, and disposing the above-mentioned plurality of piezoelectric elements in a different direction from each other. That is, when an acceleration component in various directions is made an unknown quantity, it is possible to calculate each acceleration component based on an output from the piezoelectric elements theoretically by providing piezoelectric elements in the same number as the unknown quantity. Moreover, it is possible to detect an acceleration in a frequency characteristic, into which a frequency characteristic of each piezoelectric element is compounded, by providing a polity of piezoelectric elements with a different frequency characteristic of detecting an acceleration from each other, and compounding an output from the above-mentioned plurality of piezoelectric elements. Furthermore, it is possible to detect an acceleration at a detectivity, into which a detectivity of each piezoelectric element is compounded, by providing a plurality of piezoelectric elements with a different detectivity of an acceleration from each other, and compounding an output from the above-mentioned plurality of piezoelectric elements.

The present invention is described below more concretely.

The present invention is characterized by comprising a longitudinal effect type piezoelectric element which has a first piezoelectric body and outputs a a voltage according to a expansion and contraction and a shear deformation of the above-mentioned first piezoelectric body, a lateral effect type piezoelectric element which has a second piezoelectric body and outputs a voltage according to a flexure of the above-mentioned second piezoelectric body, and a sensor substrate on which the above-mentioned longitudinal effect type piezoelectric element and the above-mentioned lateral effect type piezoelectric element are fixed.

Consequently, since an output voltage by a lateral effect according to only an acceleration component in a direction of causing a flexure occurs in the above-mentioned lateral effect type piezoelectric element, an acceleration component in the above-mentioned direction can be detected. Meanwhile, an output voltage by a longitudinal effect according to an acceleration component in a direction of causing a expansion and contraction, as well as an output voltage by a shear effect according to an acceleration component in a direction of causing a shear deformation, occurs in the above-mentioned longitudinal effect type piezoelectric element. Then, an acceleration component in the above-mentioned direction of causing a shear deformation can be detected by calculating a difference between a detection signal by the longitudinal effect type piezoelectric element and a detection signal by the lateral effect type piezoelectric element. A direction of an acceleration can be distinguished by comparing both detection signals instead of calculating the above-mentioned difference. For instance, when an output from the longitudinal effect type piezoelectric element is larger than a predetermined value according to an output from the above-mentioned lateral effect type piezoelectric element, it can be decided that an acceleration in a direction of causing a shear deformation is applied on the longitudinal effect type piezoelectric element. Meanwhile, when an acceleration is detected by only the longitudinal effect type piezoelectric element, it can be decided that only an acceleration in a direction of causing a shear deformation is applied on the above-mentioned longitudinal effect type piezoelectric element.

Since the above-mentioned longitudinal effect type piezoelectric element and lateral effect type piezoelectric element differ in frequency characteristic and detectivity, it is possible to detect an acceleration in a frequency characteristic, into which both frequency characteristics are compounded, by compounding both detection signals, and thereby to intend to make a wider band of a sensor; while it is possible to detect an acceleration at a detectivity, into which both detectivities are compounded, by switching both detection signals selectively, and thereby to intend to make a wider dynamic range of a sensor.

A piezoelectric thin film which is deposited on a deposition substrate may be used as a piezoelectric body composing the above-mentioned longitudinal effect type piezoelectric element and lateral effect type piezoelectric element. If such a piezoelectric thin film is used, a minute piezoelectric element with a high precision can be formed easily through such a fine processing as patterning by etching, and thereby it is possible that a process of sticking members is not necessary. Accordingly, it is possible to easily intend downsizing and lightness in weight of a sensor, the reduction of manufacturing costs, the determination of diverse frequency characteristics and detectivities by forming a piezoelectric element in various forms and sizes, the accumulation of the piezoelectric element, additionally the reduction of a dispersion in detectivity, and the improvement of reliability.

As described above, when a lateral effect type piezoelectric element is formed by using a piezoelectric thin film deposited on a deposition substrate as a piezoelectric body, it is possible to secure a space for a flexure of the piezoelectric element by removing through etching a part of an area in the deposition substrate on which the lateral effect type piezoelectric element touches, and thereby to form a minute acceleration sensor which can detect an acceleration by a lateral effect. More specifically, for instance, it is possible to form a lateral effect type piezoelectric element with the structure of a cantilever, a fixed beam at both ends or a double cantilever by removing through etching a part of the above-mentioned area in the above-mentioned deposition substrate from the periphery of the lateral effect type piezoelectric element in the deposition substrate. In addition, it is possible to form a lateral effect type piezoelectric element with the structure of a diaphragm in which the periphery is fixed by removing through etching a part of the above-mentioned area in the deposition substrate on the opposite side of the deposition substrate from the lateral effect type piezoelectric element.

DESCRIPTION OF THE PREFERRED EMBODIMENTS

The embodiment of a piezoelectric acceleration sensor and a manufacturing method thereof in the present invention is described below referring the figures.
(Embodiment 1)

Figure 1:
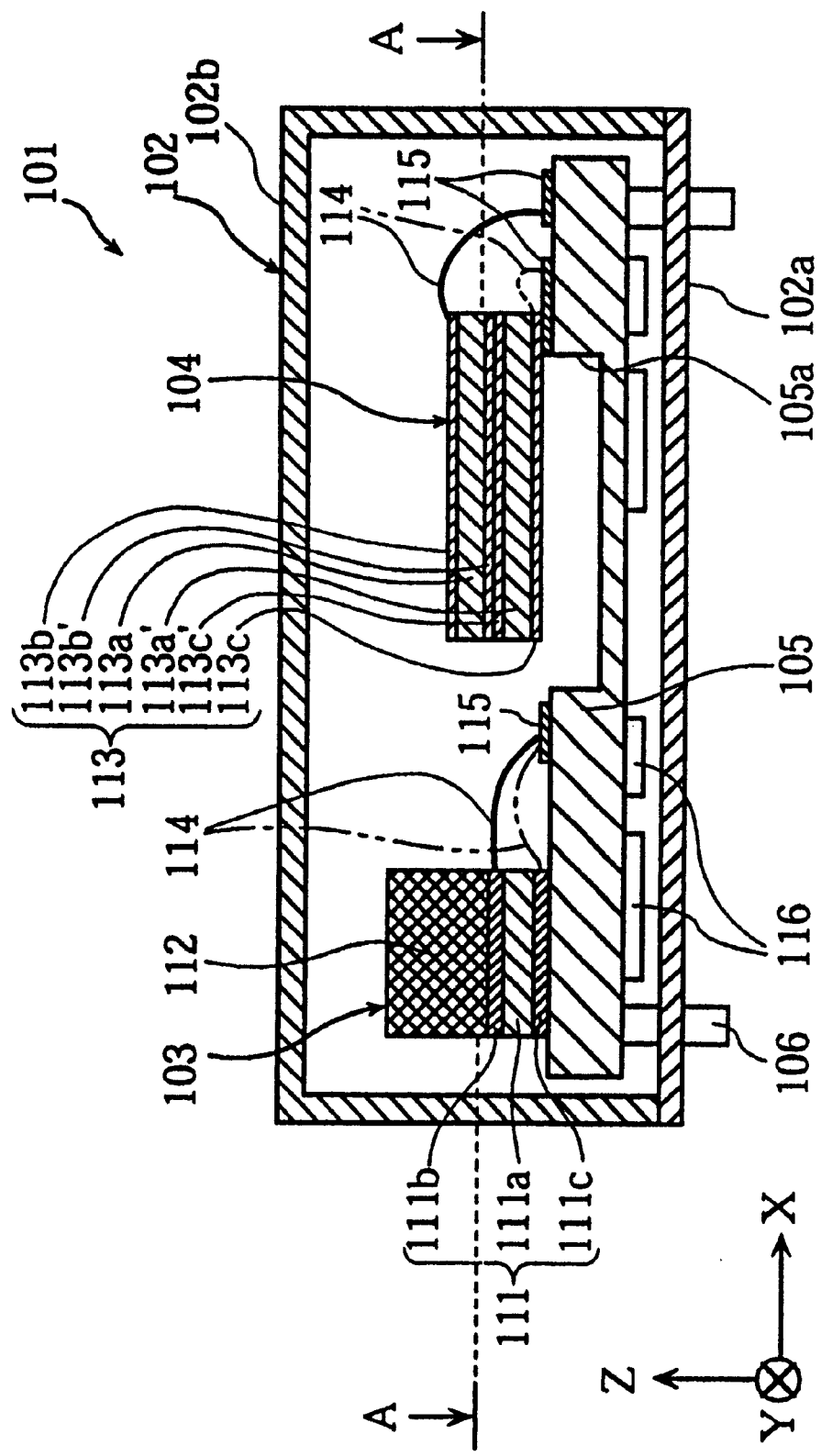
FIG. 1 is a longitudinal cross sectional view of a piezoelectric acceleration sensor in Embodiment 1.
Figure 2:
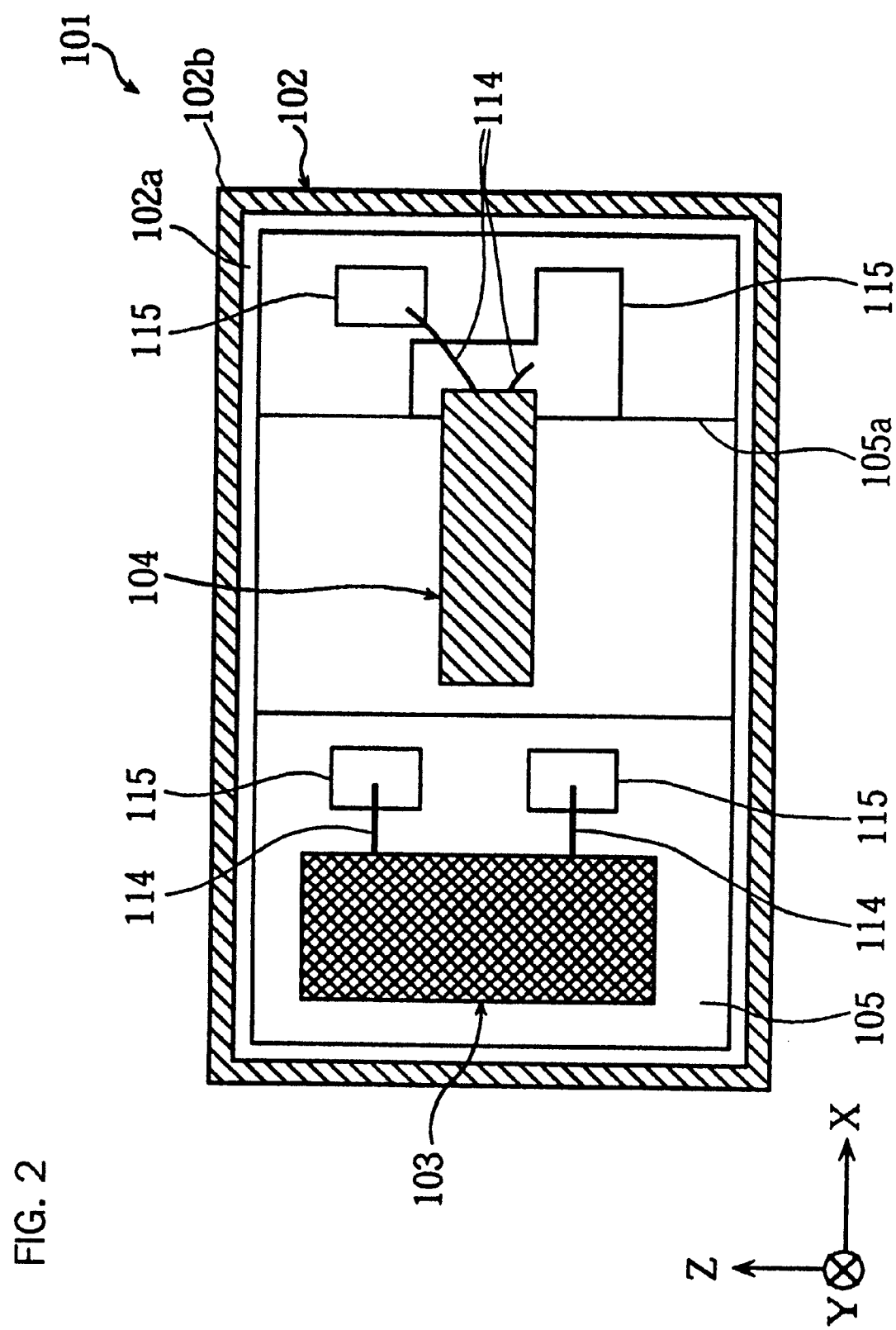
FIG. 2 is a cross sectional view taken along the line A—A in FIG. 1.

An acceleration sensor 101 is constituted by providing a substrate (sensor substrate) 105 comprising a longitudinal effect type detection unit 103 and a lateral effect type detection unit 104 inside a casing 102 comprising a base member 102a and a cap 102b, as shown in FIGS. 1 and 2. The substrate 105 is supported by a metal stem 106.

The above-mentioned longitudinal effect type detection unit 103 is constituted by sticking a weight 112 made of stainless steel on the top of a longitudinal effect type piezoelectric element 111. The above-mentioned longitudinal effect type piezoelectric element 111 is constituted by forming electrodes 111b, 111c made of gold on both sides of a piezoelectric body 111a which is such a sintered compact as PZT dead zirconate titanate), and executing polarization treating.

The lateral effect type detection umt 104 provides a lateral effect type piezoelectric element 113 which is cantilevered above a groovy recessed part 105a on the substrate 105. The above-mentioned lateral effect type piezoelectric element 113 has the structure of a serial bimorph wherein electrodes 113b, 113b', 113c, 113c' made of gold are formed on both sides of each of piezoelectric bodies 113a, 113a', and the piezoelectric bodies 113a, 113a' with an inverse polarization direction to each other are stuck together.

Each of the electrodes 111b, 111c of the above-mentioned longitudinal effect type piezoelectric element 111 and the electrodes 113b, 113c of the above-mentioned lateral effect type piezoelectric element 113 is connected to a relay terminal 115 on the substrate 105 through a bonding wire 114. In addition, the relay terminal 115 is connected to a detection circuit 116 which is provided on the backside of the substrate 105 and has a field-effect transistor, a resistance and the like.

Figure 3:
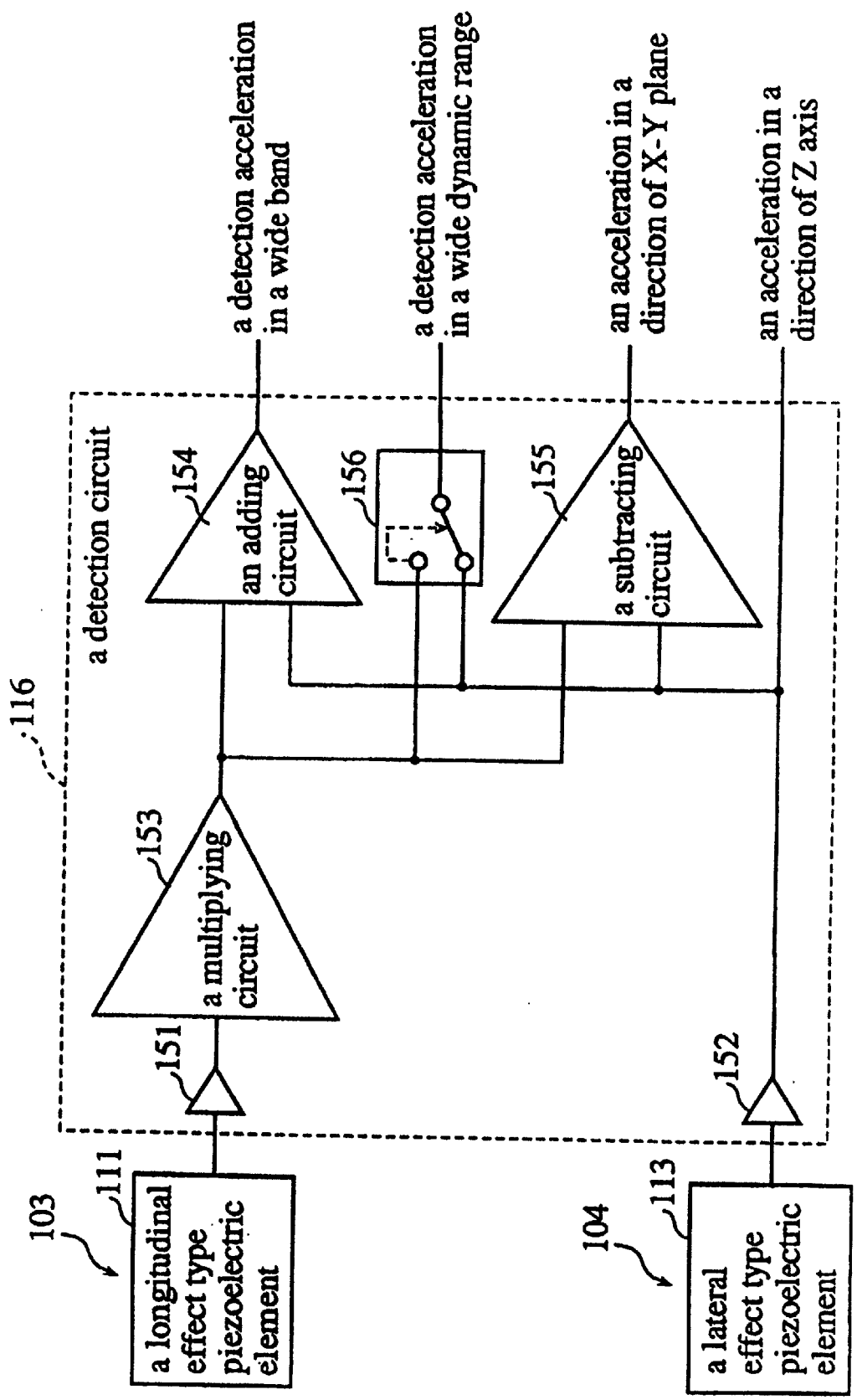
FIG. 3 is a circuit diagram of a detection circuit of a piezoelectric acceleration sensor in Embodiment 1.

The detection circuit 116, as shown in FIG. 3, is constituted by providing an impedance conversion curcuit (buffer amplifier) 151, 152; a multiplying circuit 153 for matching a detectivity by the longitudinal effect type detection unit 103 with a detectivity by the lateral effect type detection unit 104; an adding circuit 154 and a subtracting circuit 155 for adding and subtracting a detection signal by the longitudinal effect type detection unit 103 and the lateral effect type detection unit 104; and a selection circuit 156 for selecting a detection signal by the longitudinal effect type detection unit 103 and the lateral effect type detection unit 104.

In the acceleration sensor 101 constituted as described above, it is possible to distinguish and detect accurately an acceleration component in a direction of Z axis from an acceleration component in a direction of X and Y axes as shown in FIGS. 1 and 2. That is, since direction output voltage by a lateral effect according to only an acceleration component in a direction of Z axis accurs in the lateral effect type piezoelectric element 113, an acceleration component in a direction of Z axis is detected. Meanwhile, an output voltage by a longitudinal effect according to an acceleration component in a direction of Z axis, as well as an output voltage by a shear effect according to an acceleration component in a direction of X and Y axes, occurs in the longitudinal effect type piezoelectric element 111. Then, an acceleration component in a direction of X-Y plane is detected by subtracting a detection signal by the lateral effect type piezoelectric element 113 from a detection signal by the longitudinal effect type piezoelectric element 111 with the subtracting circuit 155.

Moreover, a signal for indicating an acceleration in which direction acts or not may be output after comparing a detection signal by the longitudinal effect type piezoelectric element 111 and a detection signal by the lateral effect type piezoelectric element 113 instead of or as well as a detection signal according to a value of an acceleration component. That is, when an acceleration is detected by the lateral effect type piezoelectric element 113, it can be decided that an acceleration in a direction of at least Z axis acts. Furthermore, when an acceleration detected by the longitudinal effect type piezoelectric element 111 is larger than an acceleration detected by the lateral effect type piezoelectric element 113, it can be decided that an acceleration in a direction of X-Y plane as well as an acceleration in a direction of Z axis acts, and when the former acceleration is equal to the latter acceleration, it can be decided that an acceleration in a direction of only Z axis acts. Meanwhile, when an acceleration is detected by only the longitudinal effect type piezoelectric element 111, it can be decided that an acceleration in a direction of only X-Y plane acts. (In the case of only these decision, the multiplying circuit 153 does not have to be provided since it is not always necessary to match a detectivity of the longitudinal effect type piezoelectric element 111 with a detectivity of the lateral effect type piezoelectric element 113.)

According to the above-mentioned acceleration sensor 101, an acceleration in a direction of Z axis can be detected in a wide band and a wide dynamic range. That is, the longitudinal effect type piezoelectric element 111 has a high mechanical resonance frequency, while the lateral effect type piezoelectric element 113 has a low mechanical resonance frequency; therefore, it is possible to detect an acceleration in a wide band ranging from a vibration with a low frequency to a vibration with a high frequency (ranging from an acceleration with a gentle change to an acceleration with an abrupt change) by compounding both detection signals with the adding circuit 154. Moreover, the longitudinal effect type piezoelectric element 111 can detect a comparatively large acceleration, while the lateral effect type piezoelectric element 113 can detect a minute acceleration; therefore, it is possible to detect an acceleration in a wide dynamic range by switching both detection signals according to a value of an acceleration.

It is preferable for detecting an acceleration component in the above-mentioned each direction or intending to make a wider dynamic range that a resonance frequency of the longitudinal effect type piezoelectric element 111 is close to a resonance frequency of the lateral effect type piezoelectric element 113, while it is preferable for intending to make a wider band that a difference between both resonance frequencies is large. Then, it is preferred to determine a resonance frequency of each piezoelectric element in consideration of attaching importance to any of the improvement of detection precision of an acceleration component, making a wider band, and making a wider dynamic range. The improvement of detection precision of an acceleration component, making a wider band, and making a wider dynamic range may be obtained together by providing a plurality of piezoelectric elements of the same kind with a different resonance frequency from each other.

Next, a method of manufacturing the above-mentioned acceleration sensor 101 is described.

(1) First, the electrodes 111b, 111c are formed after forming a metal film in the vacuum evaporation method on both sides of the piezoelectric body 111a which is such a sintered compact as PZT (lead zirconate titanate), and the longitudinal effect type piezoelectric element 111 is formed by executing polarization treating. The longitudinal effect type detection unit 103 is formed by sticking the weight 112 made of stainless steel with an epoxy-based adhesive on a side of this longitudinal effect type piezoelectric element 111. Such metal as nickel may be attached in a plating method instead of sticking the weight 112. In this case, it is possible to reduce more easily a dispersion in sensitivity by a difference in a state of sticking between the longitudinal effect type piezoelectric element 111 and the weight 112.

Figure 4:
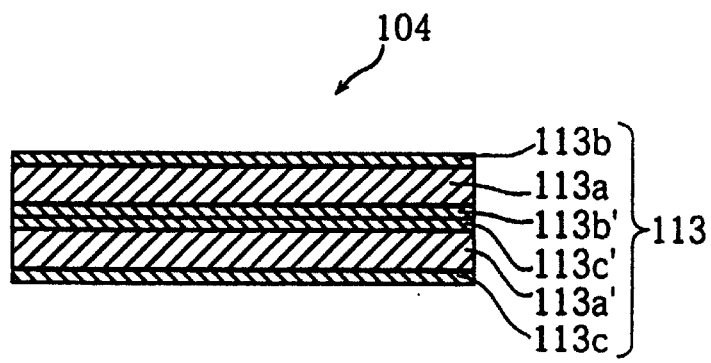
FIG. 4 is a description view showing a manufacturing process of a piezoelectric acceleration sensor in Embodiment 1.

(2) Next, as shown in FIG. 4, the lateral effect type piezoelectric element 113 is formed by sticking the piezoelectric bodies 113a, 113a' with the electrodes 113b, 113b', 113c, 113c' on both sides of each of them so that their polarization directions are inverse to each other, and is made the lateral effect type detection unit 104.

Figure 5:
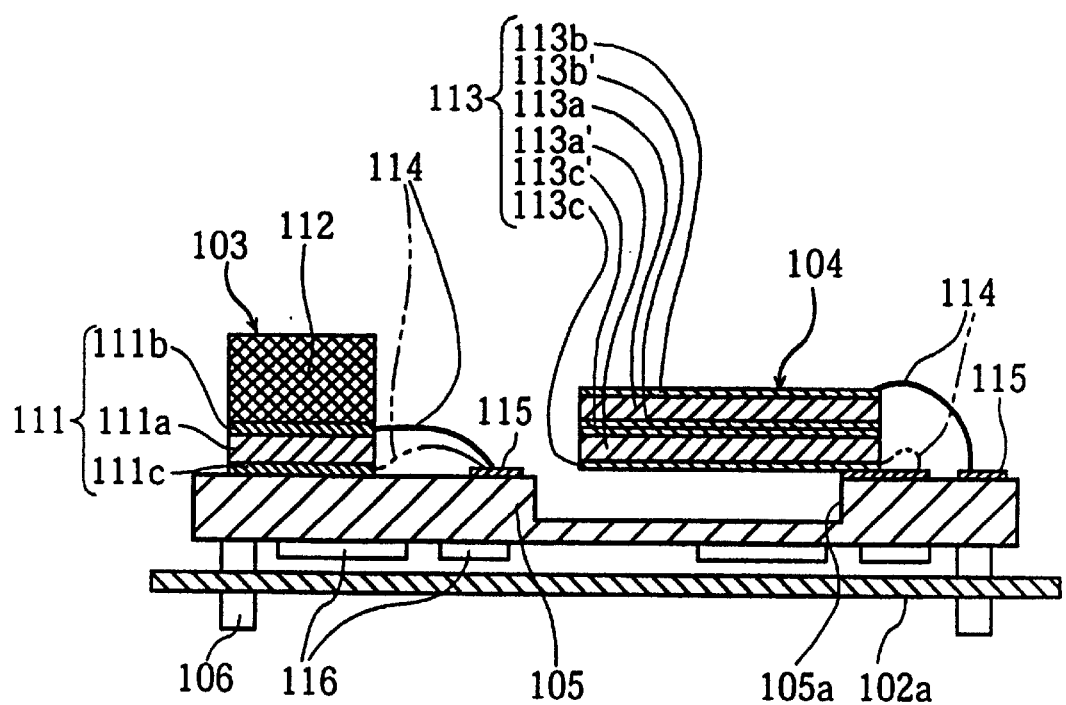
FIG. 5 is a description view showing a manufacturing process of a piezoelectric acceleration sensor in Embodiment 1.

(3) As shown in FIG. 5, the above-mentioned longitudinal effect type detection unit 103 and lateral effect type detection unit 104 are stuck with an epoxy-based adhesive on the substrate 105 which is supported through the metal stem 106 by the base member 102a. For further details, the longitudinal effect type detection unit 103 is stuck on a flat area of the substrate 105, while an end of the lateral effect type detection unit 104 is stuck so that the unit is cantilevered above the recessed part 105a on the substrate 105.

(4) The electrodes 111b, 111c, 113b, 113c of the longitudinal effect type detection unit 103 and the lateral effect type detection unit 104 are connected to the relay terminal 115 on the substrate 105 through the bonding wire 114.

(5) As shown in the above-mentioned FIG. 1, the longitudinal effect type detection unit 103 and the like are sealed up by joining the base member 102a and the cap 102b through welding.

Through the above processes, it is possible to obtain the above-mentioned small-sized and lightweight acceleration sensor 101 having the detectivity of a detection acceleration and a wide band, a wide dynamic range.

In the above-mentioned example, the structure of a bimorph is used for the lateral effect type piezoelectric element 113, and the structure of a unimorph using a piezoelectric body with a single polarization direction may be used besides this.

An example of the lateral effect type piezoelectric element 113 with the structure of a cantilever is mentioned, and it is also possible to use the structure of fixed beam at both ends, the structure of a double cantilever in which the piezoelectric element is supported in its center, and additionally, the structure of a diaphragm in which the piezoelectric element in a flat plate is supported by its periphery.

(Embodiment 2)

An example of an acceleration sensor using a piezoelectric element through crystal growth on a substrate of MgO (magnesium oxide) single crystal is described. In the embodiments below, as regards the same component as other embodiments or a component having the same function, a description is omitted properly by giving the same or corresponding sign.

Figure 6:
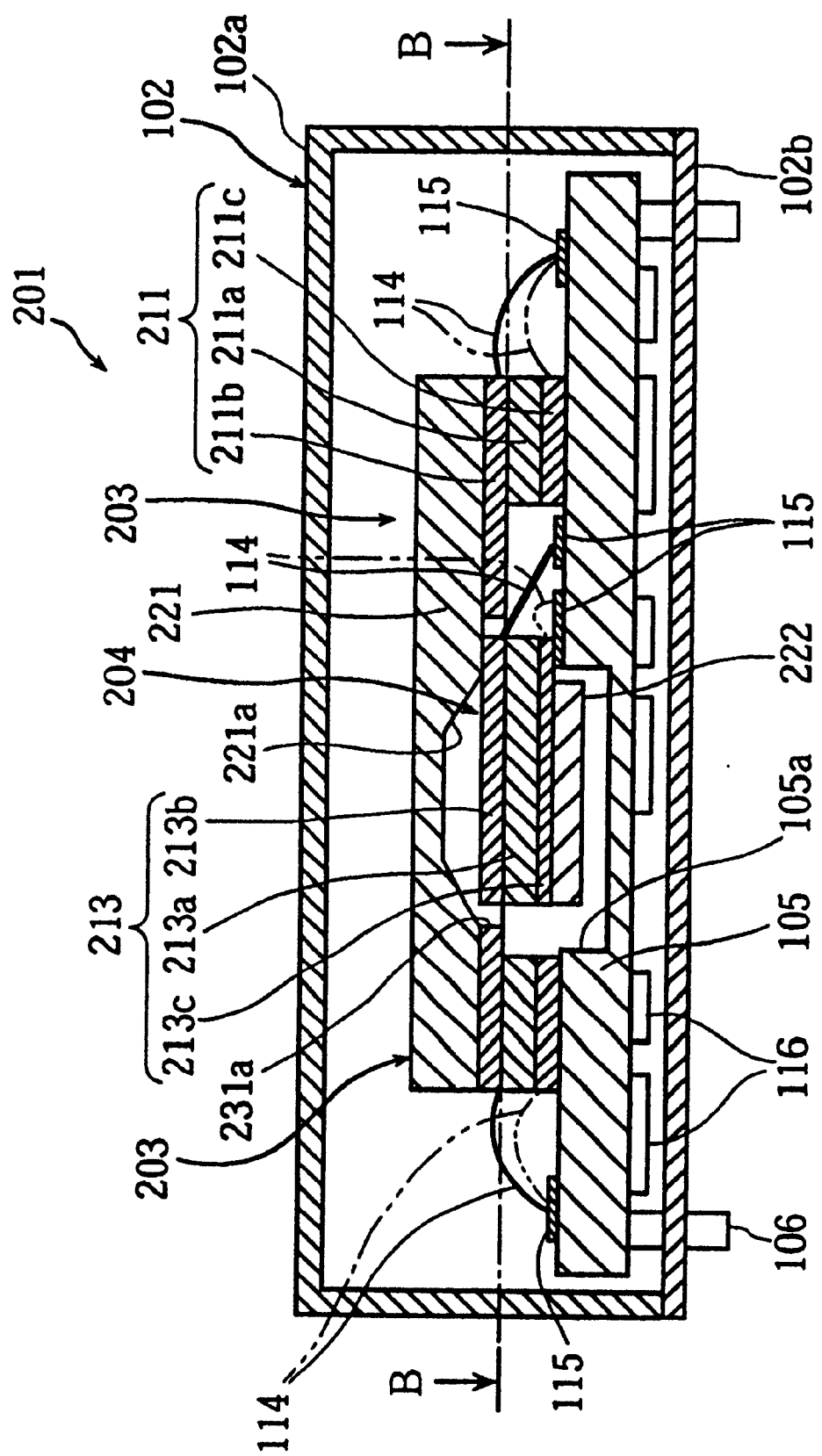
FIG. 6 is a longitudinal cross sectional view of a piezoelectric acceleration sensor in Embodiment 2.
Figure 7:
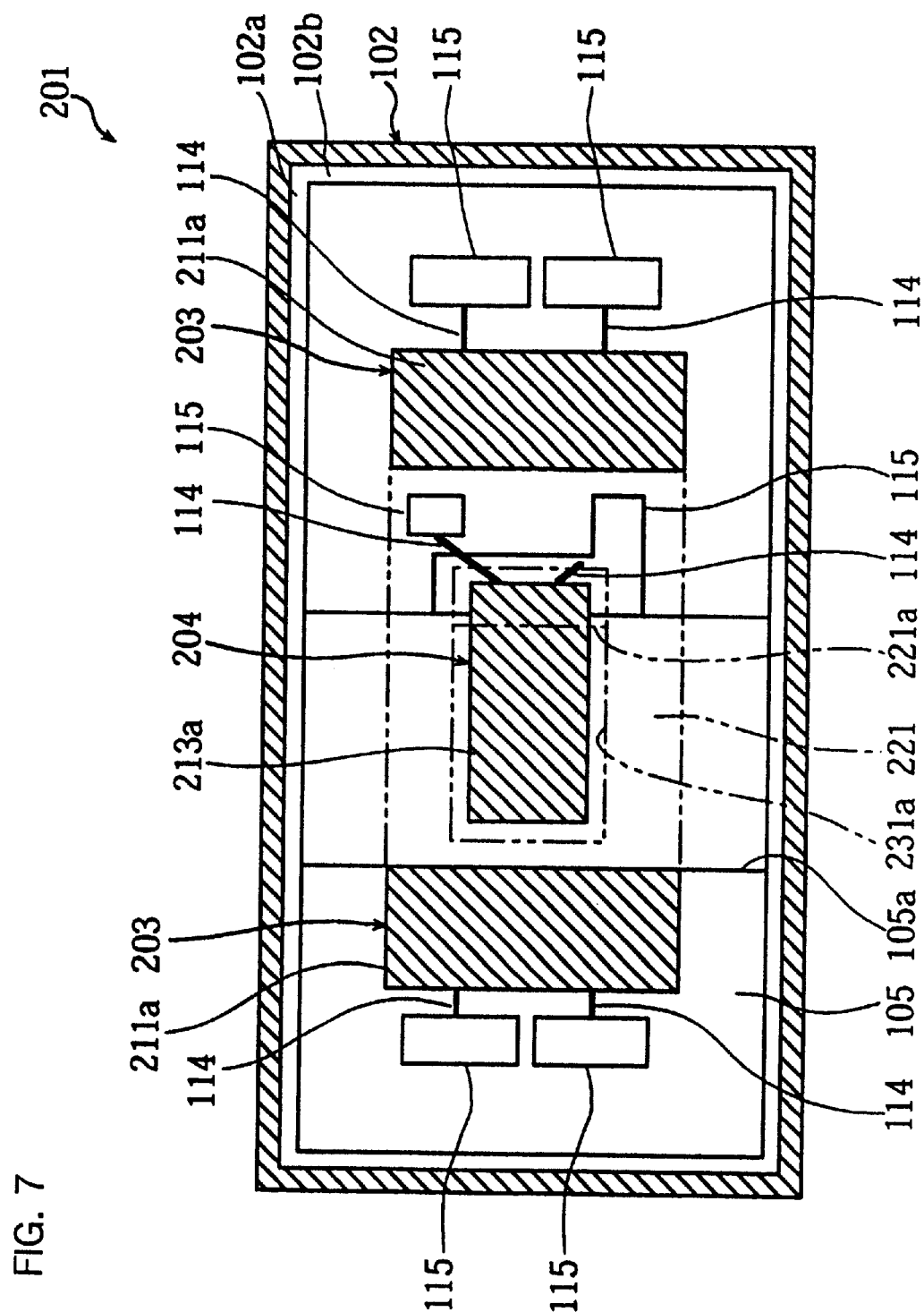
FIG. 7 is a cross sectional view taken along the line B—B in FIG. 6.

An acceleration sensor 201, as shown in FIGS. 6 and 7, comprises two longitudinal effect type detection units 203 and one lateral effect type detection unit 204 which are formed in a body. Then, although it is not always necessary to provide two longitudinal effect type detection units 203, detectivity can be improved easily by providing a plurality of longitudinal effect type detection units.

The above-mentioned longitudinal effect type detection umt 203 is composed of a deposition substrate 221 and a longitudinal effect type piezoelectric element 211. The deposition substrate 221 is made of MgO with a thickness of 500 μm and a crystal orientation of (100). The longitudinal effect type piezoelectric element 211 is constituted by forming an electrode 211b made of a platinum thin film, a piezoelectric body 211a made of a thin film of a piezoelectric body material exemplified in the following Table 1, and an electrode 211c made of a platinum thin film on a surface (the underside in FIG. 6) near both ends of the deposition substrate 221. Then, the above-mentioned deposition substrate 221 is a substrate on which each thin film of the longitudinal effect type piezoelectric element 211 is formed as described above as well as functions as a weight of the longitudinal effect type detection unit 203.

The lateral effect type detection unit 204 is composed of a lateral effect type piezoelectric element 213 and a vibration thin film (a vibration body) 222. The above-mentioned lateral effect type piezoelectric element 213, like the longitudinal effect type piezoelectric element 211, is constituted by forming an electrode 213b made of a platinum thin film, a piezoelectric body 213a made of a thin film of a piezoelectric body material, and an electrode 213c made of a platinum thin film. The vibration thin film 222 is made of a nickel-chromium (NiCr) thin film and is formed in the same thickness as the piezoelecric body 213a. This lateral effect type detection unit 204 is cantilevered by forming recessed parts 105a, 221a on a substrate 105 and the deposition substrate 221.

TABLE 1

Sputtering conditions of a piezoelectric body thin film

| piezoelectric body material | target composition | substrate temperature | sputtering gas | gas pressure | radio-frequency power density | thickness |
|---|---|---|---|---|---|---|
| $BaTiO_3$ | $BaTiO_3$ sintered compact | 600~800° C. | $Ar/O_2$ = 50/50 ~98/2% | 0.1~5.0 Pa | 1~5 W/cm² | 0.5 μm |
| PLT | mixture of powder of PbO, $La_2O_3$, $TiO_2$ (PbO excess of 20 mol %) | 570~720° C. | $Ar/O_2$ = 50/50 ~98/2% | 0.1~5.0 Pa | 1~5 W/cm² | 2.0 μm |
| $PbTiO_3$ | mixture of powder of PbO, $TiO_2$ PbO excess of 20 mol % | 570~720° C. | $Ar/O_2$ = 50/50 ~98/2% | 0.1~5.0 Pa | 1~5 W/cm² | 2.0 μm |
| PZT | PZT sintered compact PbO excess of 20 mol %) | 570~720° C. | $Ar/O_2$ = 50/50 ~98/2% | 0.1~5.0 Pa | 1~5 W/cm² | 2.0 μm |
| PLZT | PLZT sintered compact PbO excess of 20 mol %) | 570~720° C. | $Ar/O_2$ = 50/50 ~98/2% | 0.1~5.0 Pa | 1~5 W/cm² | 2.0 μm |

1) All materials were manufactured by the radio-frequency magnetron sputtering method. (The frequency was 13.56 MHz.)
2) PLT = $Pb_{0.9}La_{0.1}Ti_{0.975}O_3$
3) PZT = $PbZr_{0.50}Ti_{0.50}O_3$
4) PLZT = $Pb_{0.9}La_{0.1}(Zr_{0.1}Ti_{0.9})_{0.975}O_3$ Also in the acceleration sensor 201 constituted as described above, it is possible to detect an acceleration component in each direction as well as an acceleration in a wide band and a wide dynamic range, like the acceleration sensor 101 in the above-mentioned Embodiment 1. In addition, since a joint of the deposition substrate 221 for functioning as a weight and the longitudinal effect type piezoelectric element 211 as well as a joint of the lateral effect type piezoelectric element 213 and the vibration thin film 222 are executed by not sticking but a the of forming thin film, a dispersion in sensitivity can be restrained and the reliability is improved. Moreover, since the longitudinal effect type detection units 203 and the lateral effect type detection unit 204 are formed in a body, the number of parts gets fewer and manufacturing costs are reduced.

Next, a method of manufacturing the above-mentioned acceleration sensor 201 is described.

Figure 8:
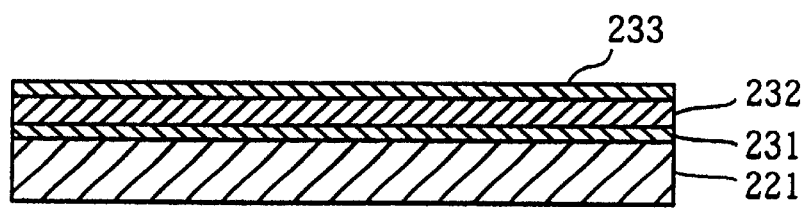
FIG. 8 is a description view showing a manufacturing process of a piezoelectric acceleration sensor in Embodiment 2.

(1) As shown in FIG. 8, an electrode thin film 231, a piezoelectric body thin film 232 and an electrode thin film 233 are deposited sequentially on a surface of the deposition substrate 221 made of MgO with a thickness of 500 μm and a crystal orientation of (100). For further details, (1-1) First, the electrode thin film 231 made of platinum with a thickness of 0.15 μm is deposited on the deposition substrate 221 made of MgO with a thickess of 500 μm and a crystal orientation of (100) by the radio-frequency magnetron sputtering method on the following conditions of sputter deposition.
(a) substrate temperature: 500 to 700° C.
(b) sputtering gas: a mixed gas of argon (50 to 98%) and oxygen (50 to 2%)
(c) gas pressure: 0.1 to 3 Pa
(d) power density of radio-frequency injection: 1 to 5 W/cm² (13.56 M Hz)
(e) deposition time: 1 hour (1-2) The piezoelectric body thin film 232 is deposited on materials and sputtering conditions shown in the above-mentioned Table 1. Because of depositing on such conditions, a single crystal film with c axial orientation having a tetragonal crystal structure, wherein polarization axis is preferentially oriented in a vertical direction to a surface of the deposition substrate 221, is formed over the whole piezoelectric body thin film 232.

(1-3) The electrode thin film 233 made of platinum with a thickness of 0.15 μm is deposited like the above-mentioned (1-1).

Figure 9:
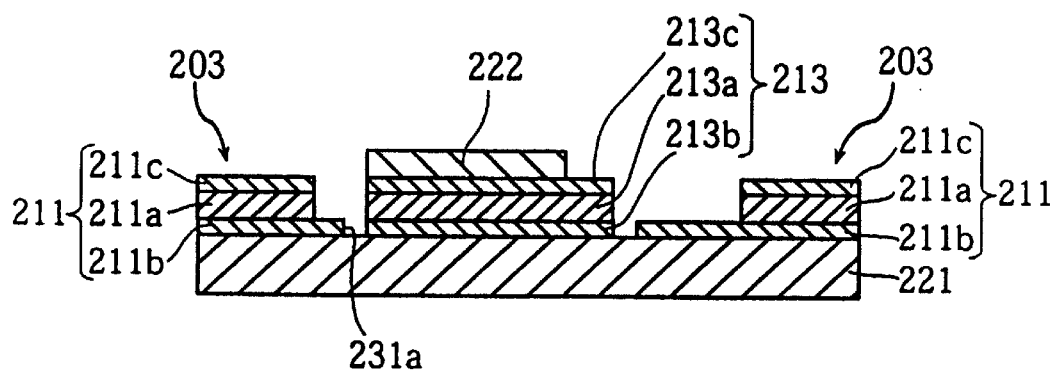
FIG. 9 is a description view showing a manufacturing process of a piezoelectric acceleration sensor in Embodiment 2.

(2) As shown in FIG. 9, the electrodes 211c, 213c, the piezoelectric bodies 211a, 213a, and the electrodes 211b, 213b of the longitudinal effect type piezoelectric element 211 and the lateral effect type piezoelectric element 213 are formed by patterning the electrode thin film 233, the piezoelectric body thin film 232 and the electrode thin film 231 through etching. For further details, (2-1) First, the electrodes 211c, 213c are formed by forming a predetermined mask pattern on the electrode thin film 233, and executing sputter etching on the following conditions.
(a) vacuum: 0.01 to 1.0 Torr
(b) flow rate of argon gas: 1 to 20 sccm
(c) plasma power: 100 to 300 W
(d) etching time: 15 minutes (2-2) Next, the piezoelectric bodies 211a, 213a are formed by etching the piezoelectric body thin film 232 on process conditions exemplified in the following Table 2.

(2-3) Furthermore, the electrodes 211b, 213b are formed by patterning the extrude thin film 231 like the above-mentioned (2-1).

TABLE 2

Patterning methods of a piezoelectric body thin film

| piezoelectric body material | etching method | process conditions | thickness | process time |
|---|---|---|---|---|
| BaTiO$_3$ | RIE | Cl$_2$ = 10 sccm, 1 mTorr, 200 W | 0.5 µm | 30 min. |
| PLT | Chemical | HF/HNO$_3$/H$_2$O = 5/1/15~5/20/15 etchant temperature = 25° C. | 2.0 µm | 2 min. |
| PbTiO$_3$ | Chemical | HF/HNO$_3$/H$_2$O = 5/1/15~5/20/15 etchant temperature = 25° C. | 2.0 µm | 2 min. |
| PZT | Chemical | HF/HNO$_3$/H$_2$O = 5/1/15~5/20/15 etchant temperature = 25° C. | 2.0 µm | 3 min. |
| PLZT | Chemical | HF/HNO$_3$/H$_2$O = 5/1/15~5/20/15 etchant temperature = 25° C. | 2.0 µm | 3 min. |

1) PLT = Pb$_{0.9}$La$_{0.1}$Ti$_{0.975}$O$_3$
2) PZT = PbZr$_{0.50}$Ti$_{0.50}$O$_3$
3) PLZT = Pb$_{0.9}$La$_{0.1}$(Zr$_{0.1}$Ti$_{0.9}$)$_{0.975}$O$_3$
4) RIE = Reactive ion etching
5) Chemical = chemical etching (3) The vibration thin film 222 with the same thickness as the piezoelectric body thin film 232 is formed on the electrode 213c. For further details, a nickel-chromium (NiCr) thin film is formed by the radio-frequency magnetron sputtering method on the following conditions.
  (a) substrate temperature: 25 to 300° C.
  (b) sputtering gas: argon gas
  (c) gas pressure: 0.1 to 2.0 Pa
  (d) power density of radio-frequency injection: 1 to 5 W/cm$^2$ (13.56 M Hz)

Metal materials with a high Young's modulus, such as platinum (Pt), chromium (Cr) and aluminum (Al) besides the above-mentioned NiCr, are suitable for the vibration thin film 222, and insulators, such as silicon dioxide (SiO$_2$), resin film or photoresist, can be used. A chemical method like a plating method as well as a physical method by a vacuum device is applicable to a depositing method. It is easily possible to reduce an influence by the torsion of the lateral effect type piezoelectric element 213, and to determine desirable natural frequency and strength by forming the vibration thin film 222 as described above. However, when the lateral effect type piezoelectric element 213 has sufficient rigidity and strength and the structure of a fixed beam at both ends is used, the diaphragm does not necessarily have to be formed, and additionally the electrodes 213b, 213c may have a function as the vibration thin film 222.

Figure 10:
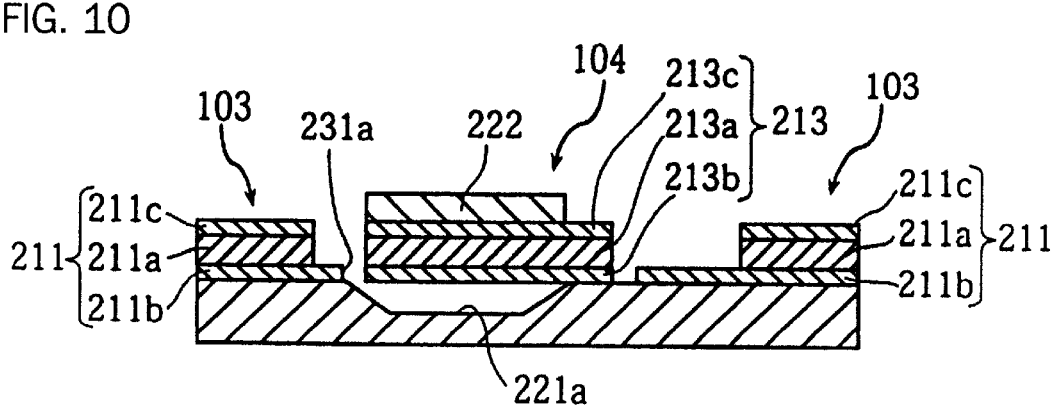
FIG. 10 is a description view showing a manufacturing process of a piezoelectric acceleration sensor in Embodiment 2.

(4) As shown in FIG. 10, the recessed part 221a is formed by removing a part of the deposition substrate 221 below the lateral effect type piezoelectric element 213 except an end of the lateral effect type piezoelectric element 213 in a chemical etching using an aqueous solution of phosphoric acid at a temperature of 80° C. trough an etching hole 231a in a slit which is formed between the electrode 211b and 213b in forming the electrodes 211b, 213b out of the above-mentioned electrode thin film 231. Then, in order not to execute the etching in a part of the deposition substrate 221 at the above-mentioned end of the lateral effect type piezoelectric element 213, it is preferred to execute the masking on an etching hole 231a in the part.

Figure 11:
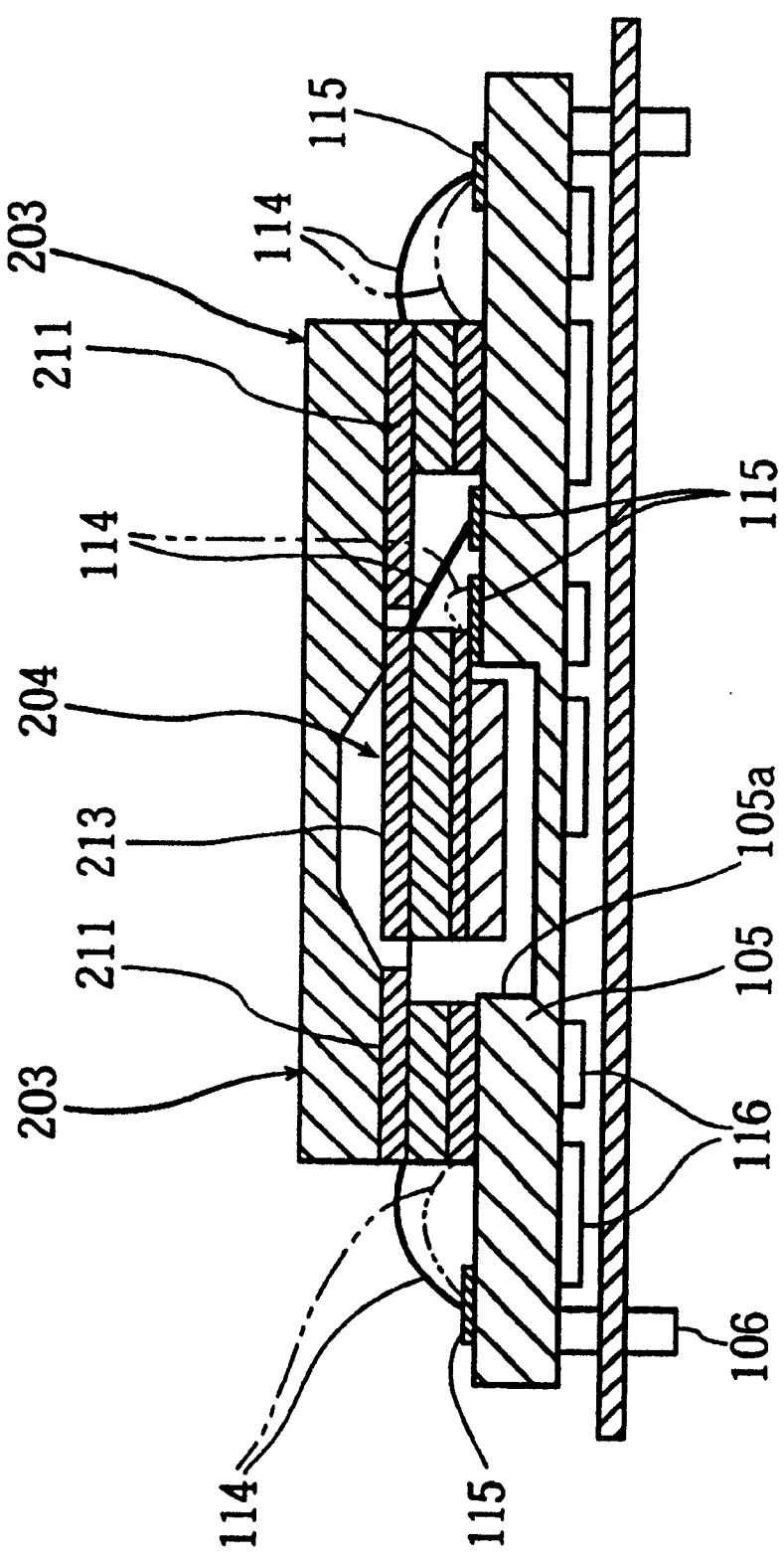
FIG. 11 is a description view showing a manufacturing process of a piezoelectric acceleration sensor in Embodiment 2.

(5) As shown in FIG. 11, the longitudinal effect type piezoelectric element 211 and the lateral effect type piezoelectzic element 213 formed on the deposition substrate 221 are stuck and fixed on the substrate 105. Then, the lateral effect type piezoelectric element 213 is mostly located between the recessed part 105a on the substrate 105 and the recessed part 221a on the deposition substrate 221, and is cantilevered by holding an end of the element between the substrate 105 and the deposition substrate 221. The vibration thin film 222 as may be cantilevered by forming the vibration thin film 222 at the same length as the lateral effect type piezoelectric element 213. It is preferred to fix certainly an end of the lateral effect type piezoelectric element 213 on either of the substrate 105 and the deposition substrate 221 instead of holding an end of the element between them as described above.

(6) The electrodes 211b, 211c, 213b, 213c are connected to a relay terminal 115 on the substrate 105 through a bonding wire 114.

(7) As shown in the above-mentioned FIG. 6, the longitudinal effect type detection unit 203 and the like are sealed up by joining a base member 102a and a cap 102b through welding.

Through the above processes, it is possible to easily manufacture the above-mentioned acceleration sensor with a narrow dispersion in sensitivity, a high reliability and cheap manufacturing costs. In addition, since patterning by etching is used for forming the longitudinal effect type piezoelectric element 211 and the lateral effect type piezoelectric element 213, it is also possible to easily manufacture a small-sized acceleration sensor by forming the minute longitudinal effect type piezoelectric element 211 and lateral effect type piezoelectric element 213, and an acceleration sensor wherein a plurality of piezoelectric elements are disposed and accumulated one-dimensionally and two-dimensionally. Furthermore, since a piezoelectric element can be formed easily into various forms and sizes, it is also possible to easily determine mechanical resonance frequency and sensitivity diversely (more specifically, transverse cross section area and thickness diversely in the case of the longitudinal effect type piezoelectric element, while length, width and thickness diversely in the case of the lateral effect type piezoelectric element), and to easily intend to make even wider band and wider dynamic range by combining these.

In the above-mentioned example, the structure of a unimorph is used for the lateral effect type piezoelectric element 213, and the structure of a bimorph wherein piezoelectric bodies with an inverse polarization direction to each other are stuck together may be used like the above-mentioned Embodiment 1.

The structure of a fixed beam at both ends, the structure of a double cantilever, and the structure of a diaphragm may be used for the lateral effect type piezoelectric element 213 as described in the above-mentioned Embodiment 1.

It is described in the above-mentioned example that the longitudinal effect type piezoelectric element 211 formed on the deposition substrate 221 is stuck and fixed on the substrate 105, and the above-mentioned deposition substrate 221 functions as a weight of the longitudinal effect type detection unit 203. The deposition substrate 221 may be fixed on the substrate 105 or may function as the substrate 105 by providing a weight apart from the deposition substrate 221 for the longitudinal effect type piezoelectric element 211.

(Embodiment 3)

Figure 12:
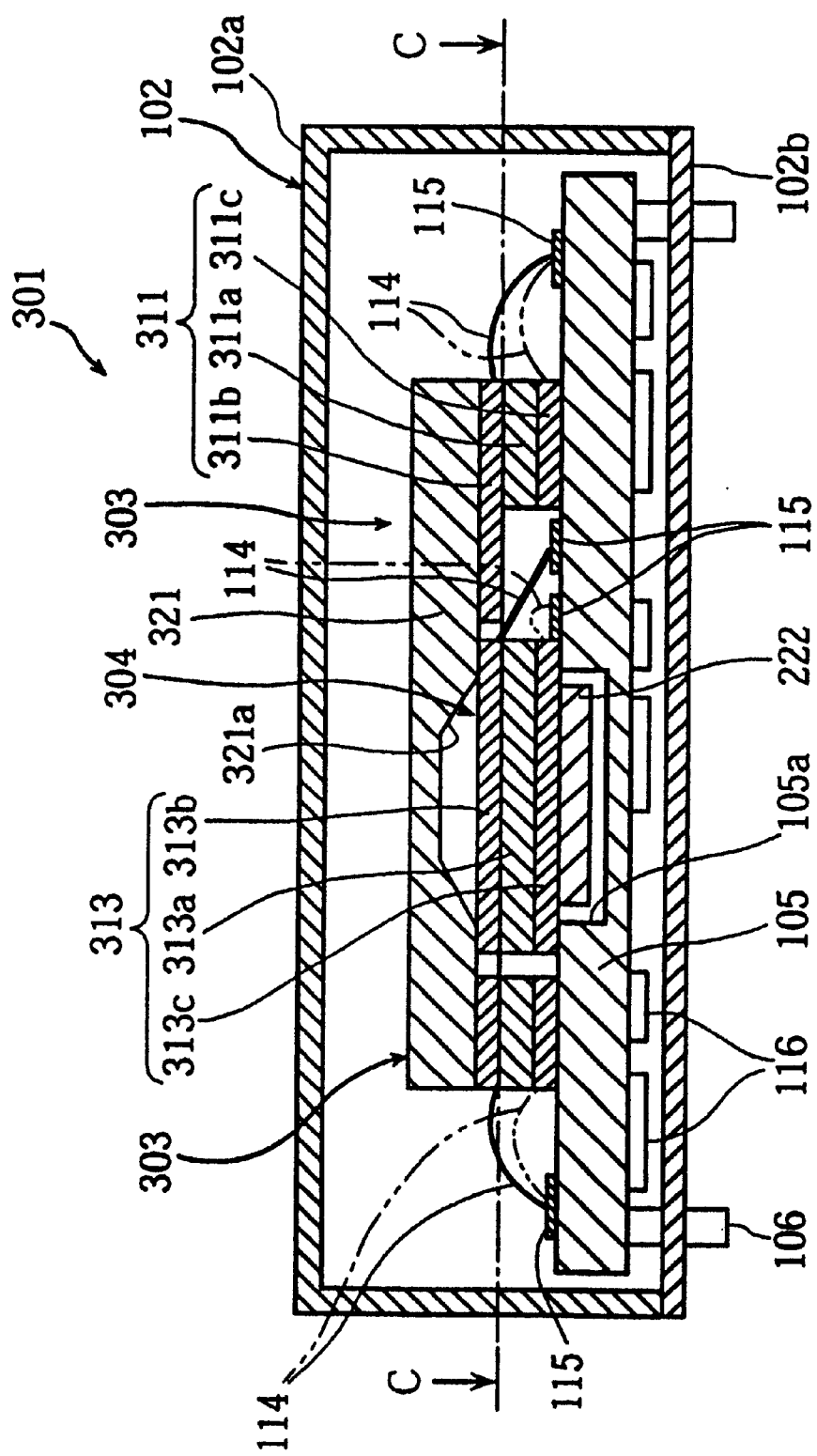
FIG. 12 is a longitudinal cross sectional view of a piezoelectric acceleration sensor in Embodiment 3.
Figure 13:
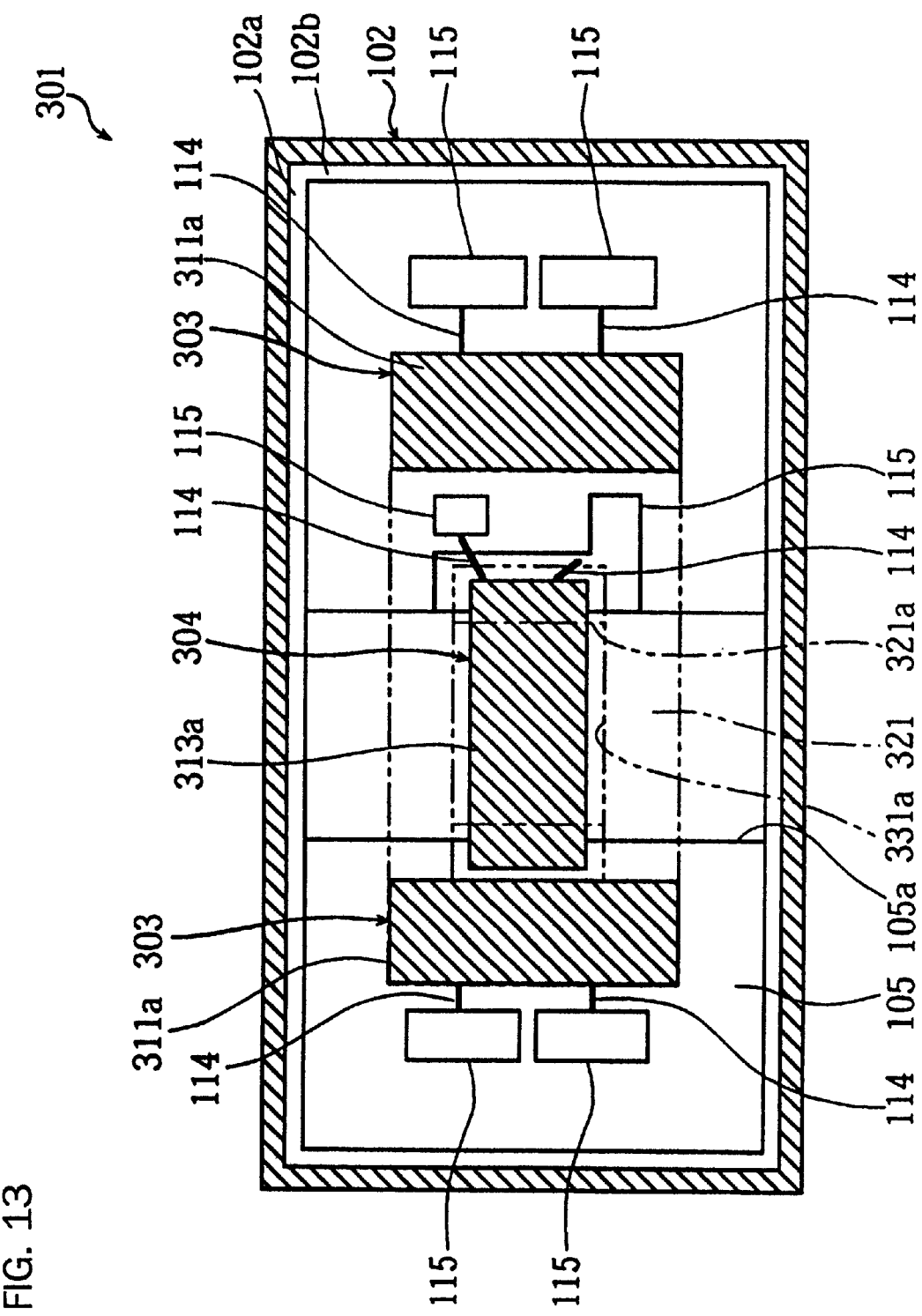
FIG. 13 is a cross sectional view taken along the line C—C in FIG. 12.

An acceleration sensor 301 in Embodiment 3, as shown in FIGS. 12 and 13, differs in the following respects as compared with an acceleration sensor in the above-mentioned Embodiment 2.

(a) A silicon (Si) single crystal substrate is used as a deposition substrate 321.

(b) A lateral effect type piezoelectric element 313 with the structure of a fixed beam at both ends is provided for a lateral effect type detection unit 304.

(c) Lead zirconate titanate PZT) having a rhombohedral crystal structure is used as piezoelectric bodies 311a, 313a of a longitudinal effect type piezoelectric element 311 and a lateral effect type piezoelectric element 313 composing a longitudinal effect type detection units 303 and a lateral effect type detection unit 304.

The acceleration sensor 301 is the same as Embodiment 2 in the other respects.

That is, an Si single crystal substrate (4-inch wafer) with a crystal orientation of (100) is used as the deposition substrate 321. Recessed parts 321a, 105a on the deposition substrate 321 and a substrate 105 are formed so as to be shorter than the lateral effect type piezoelectric element 313. Then, the recessed part 321a on the deposition substrate 321 can be formed by using a mixed solution of nitric acid/hydrofluoric acid as an etchants. The lateral effect type piezoelectric element 313 is made a fixed beam at both ends wherein both ends are fixed by forming the above-mentioned recessed parts 321a, 105a. In this case, mechanical resonance frequency gets higher as compared to a cantilever with the same length. Although sensitivity gets lower, strength is improved and thereby a large acceleration is easily detected.

A rhombohedral crystal PZT composing the piezoelectric bodies 311a, 313a can be deposited on the same conditions as the above-mentioned Table 1 except a target composition of $(0.8PbZr_{0.56}Ti_{0.44}O_3+0.2PbO)$. Consequently, a PZT film with (111) plane orientation, wherein polarization axis is preferentially oriented in a vertical direction to a surface of the deposition substrate 321, is formed. The PZT film with (111) plane orientation can be obtained regardless of a crystal orientation of the deposition substrate 321.

Also in the acceleration sensor 301 constituted as described above, it is possible to detect an acceleration component in each direction as well as an acceleration in a wide band and a wide dynamic range, like the acceleration sensors 101, 201 in the above-mentioned Embodiments 1 and 2. Such effects as the reduction of a dispersion in sensitivity, the improvement of reliability, the reduction of manufacturing costs and downsizing are obtained like the acceleration sensor 201 in Embodiment 2.

The same materials as the above-mentioned Embodiment 2 may be used for the deposition substrate 321 and the piezoelectric bodies 311a, 313a besides the above-mentioned materials. The diverse variation examples described in Embodiments 1 and 2 are applicable.

(Embodiment 4)

Figure 14:
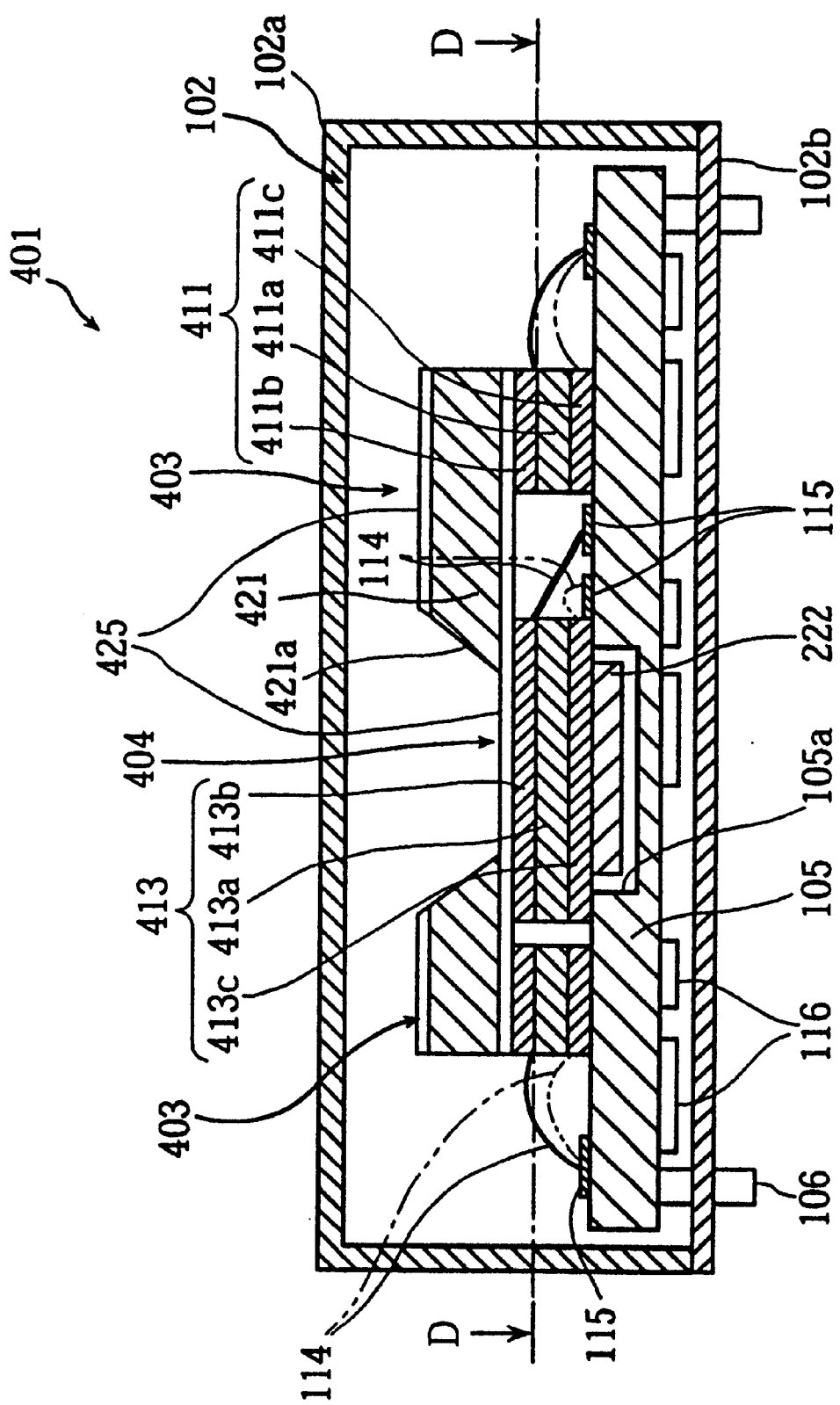
FIG. 14 is a longitudinal cross sectional view of a piezoelectric acceleration sensor in Embodiment 4.
Figure 15:
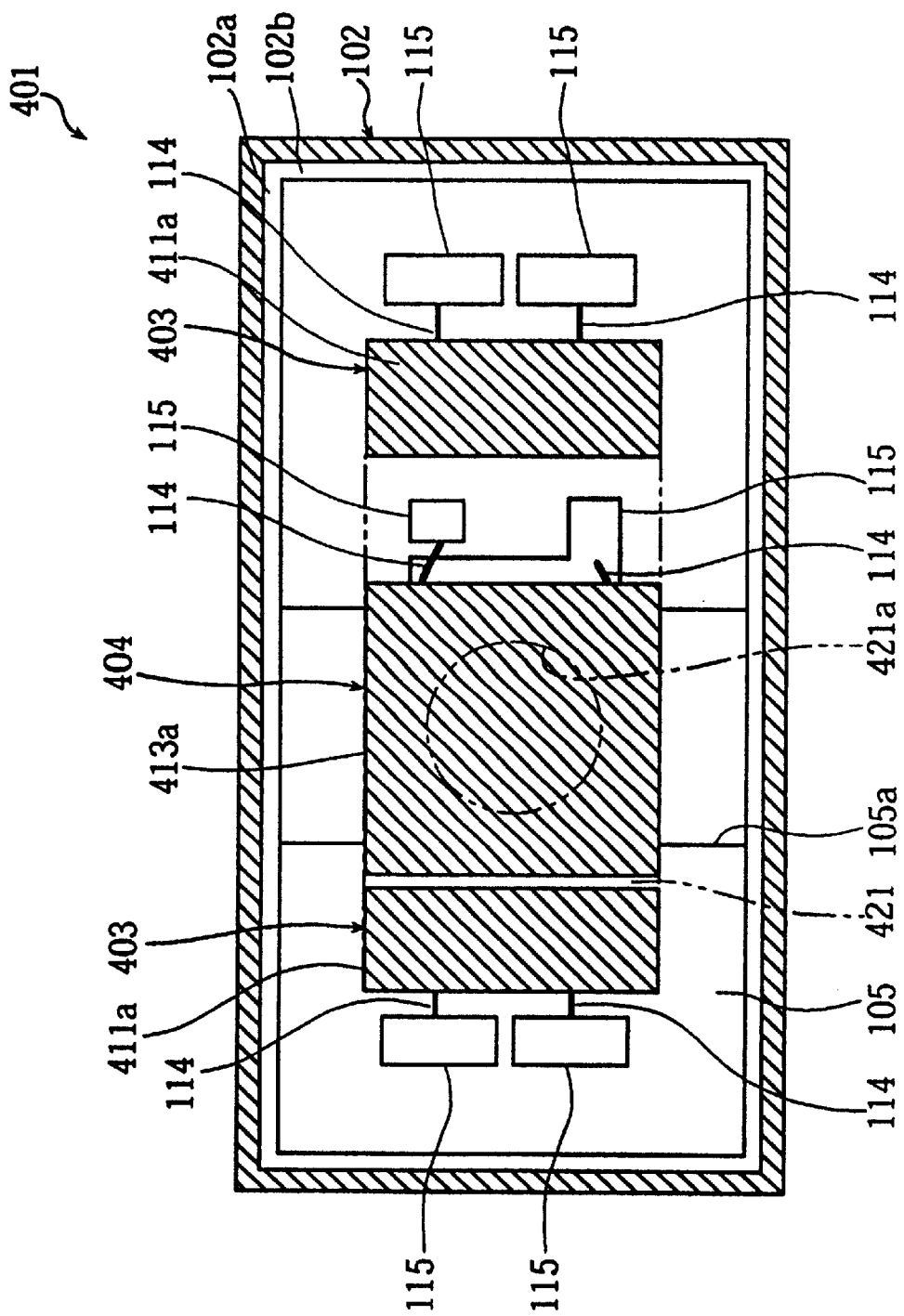
FIG. 15 is a cross sectional view taken along the line D—D in FIG. 14.

An acceleration sensor 401 in Embodiment 4, as shown in FIGS. 14 and 15, is constituted by forming the structure of a diaphragm in which a smaller hole 421a than an outline of a lateral effect type piezoelectric element 413 is formed on a deposition substrate 421 and the lateral effect type piezoelectric element 413 is supported by the periphery of the hole. The other constitutions are the same as the above-mentioned Embodiment 3. In the case of the above-mentioned structure of a diaphragm, a mechanic resonance frequency of the lateral effect type piezoelectric element 413 is easily determined higher than a cantilever and a fixed beam at both ends. In this case, although sensitivity gets lower, strength is improved and thereby a large acceleration is easily detected.

A method of manufacturing the above-mentioned acceleration sensor 401 is described below.

Figure 16:
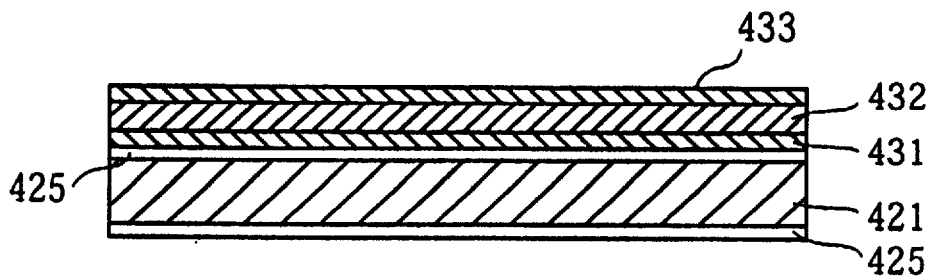
FIG. 16 is a description view showing a manufacturing process of a piezoelectric acceleration sensor in Embodiment 4.

(1) As shown in FIG. 16, a silicon nitride film 425 with a thickness of 2000 Å as a mask material is deposited on both surfaces of the deposition substrate 421 made of an Si single crystal substrate (4-inch wafer) with a crystal orientation of (100), and additionally an electrode thin film 431, a piezoelectric body thin film 432 and an electrode thin film 433 are deposited sequentially on a surface of one of the silicon nitride films. The above-mentioned silicon nitride film 425 can be deposited by a low-pressure chemical vapor-phase growth method (LPCVD) using a mixed gas of silane ($SiH_4$) and ammonia ($NH_3$) as reaction gas at a deposition temperature of 700° C. Meanwhile, a material and a depositing method of the electrode thin film 431, the piezoelectric body thin film 432 and the electrode thin film 433 are the same as the above-mentioned Embodiment 2.

Figure 17:
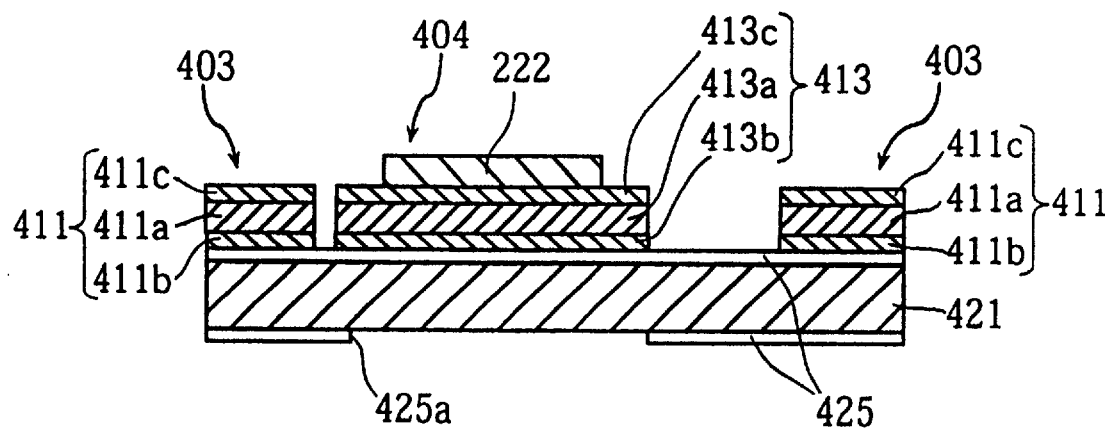
FIG. 17 is a description view showing a manufacturing process of a piezoelectric acceleration sensor in Embodiment 4.

(2) Like Embodiment 2, as shown in FIG. 17, electrodes 411c, 413c, piezoelectric bodies 411a, 413a, and electrodes 411b, 413b of a longitudinal effect type piezoelectric element 411 and the lateral effect type piezoelectric element 413 composing a longitudinal effect type detection units 403 and a lateral effect type detection unit 404 are formed by patterning the electrode thin film 433, the piezoelectric body thin film 432 and the electrode thin film 431 through etching. Moreover, a vibration thin film (a diaphragm thin film 222 is formed.

Furthermore, an etching hole 425a is formed on a silicon nitride film 425 (the underside in FIG. 17) by a reactive ion etching method using carbon tetrafluoride ($CF_4$) as reaction gas with a mask pattern not shown in a figure.

Figure 18:
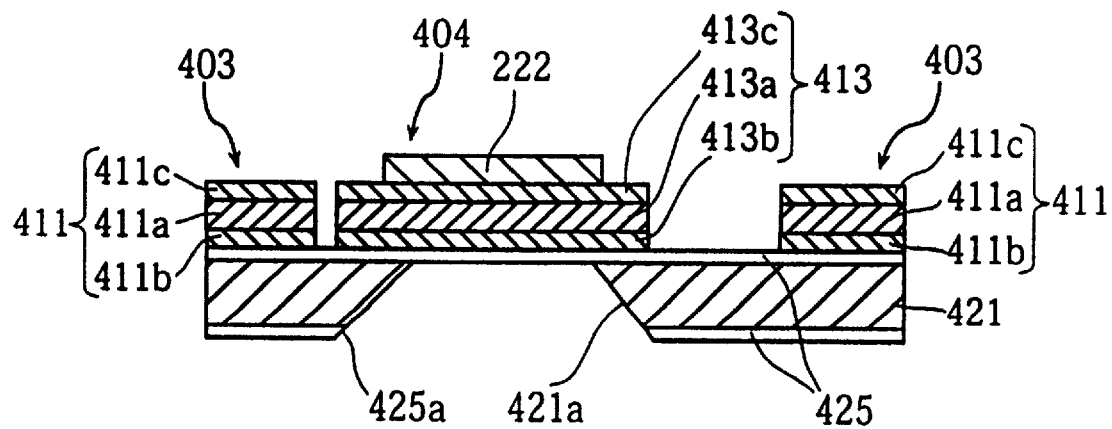
FIG. 18 is a description view showing a manufacturing process of a piezoelectric acceleration sensor in Embodiment 4.

(3) As shown in FIG. 18, the hole 421a is formed in a position of the deposition substrate 421 corresponding to the lateral effect type piezoelectric element 413 thought the above-mentioned etching hole 425a by an anisotropic chemical etching using such an alkaline solution as potassium hydroxide (KOH).

Figure 19:
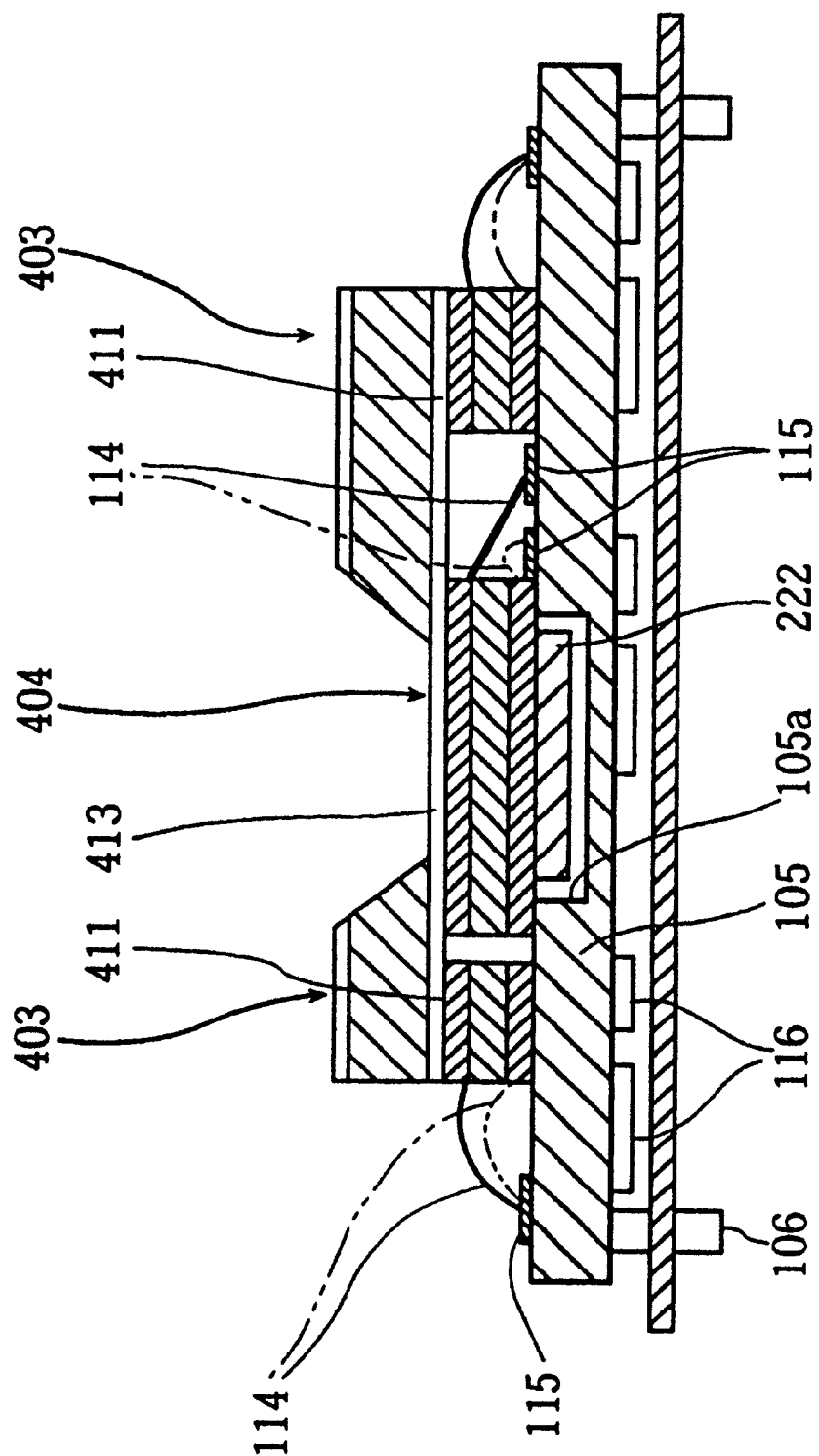
FIG. 19 is a description view showing a manufacturing process of a piezoelectric acceleration sensor in Embodiment 4.

(4) As shown in FIG. 19, the longitudinal effect type piezoelectric element 411 and the lateral effect type piezoelectric element 413 formed on the deposition substrate 421 are stuck and fixed on a substrate 105.

(5) The electordes 411b, 411c, 413b, 413c are connected to a relay terminal 115 on the substrate 105 through a bonding wire 114.

(6) As shown in the above-mentioned FIG. 14, the longitudinal effect type detection unit 403 and the like are sealed up by joining a base member 102a and a cap 102b through welding.

Also in the acceleration sensor 401 constituted as described above, it is possible to obtain such an effect as the detection of an acceleration component in each direction, like the acceleration sensors 101 to 301 in the above-mentioned Embodiments 1 to 3.

The diverse variation examples described in the above-mentioned Embodiments 1 to 3, such as the structure a bimorph is used for the lateral effect type piezoelectric element 413 and a plurality of piezoelectric elements with the structure of a diaphragm are disposed and accumulated one-dimensionally and two-dimensionally, are applicable also in Embodiment 4.

An example of a combination of a predetermined structure (the structure of a cantilever, a fixed beam at both ends and a diaphragm) of a lateral effect type piezoelectric element and a predetermined material and depositing method is described in each of the above-mentioned Embodiments 2 to 4, and besides this, various combinations are usable. That is, for instance, a lateral effect type piezoelectric element with the structure of a fixed beam at both ends or a diaphragm may be formed while using an MgO single crystal substrate as a deposition substrate. Moreover, for instance, in Embodiments 2 and 3, a hole may be formed by proceeding further with etching instead of forming a recessed part on a deposition substrate from the side of a piezoelectric element, and etching may be executed in a state of a hole or a belt on the backside of a deposition substrate by using a mask material like Embodiment 4.

Although it is preferable in terms of sensitivity that a direction of a polarization axis of a piezoelectric body is vertical to a substrate as described in Embodiments 2 to 4, the above-mentioned effect of the present invention is obtained even if a direction of a polarization axis of a piezoelectric body is diagonal to a substrate.

Various materials and depositing methods as well as the above-mentioned materials and depositing methods are applicable to a piezoelectric body and an electrode in Embodiments 1 to 4, and a deposition substrate in Embodiments 2 to 4.

An example wherein a groovy recessed part is formed on a substrate for forming a lateral effect type piezoelectric element with the structure of a cantilever and the like is described in Embodiments 1 to 4, and besides this, it is preferred that the displacement of a piezoelectric body is obtained appropriately, for instance, a hole is formed on a substrate.

A detection circuit is provided not merely on the backside of a substrate, namely, inside an acceleration sensor as described above, but also the whole or a part of the circuit may be provided outside. An impedance conversion circuit may be omitted depending on the electrostatic capacity of a piezoelectric element. In addition, a constitution of a detection circuit is not limited to a constitution shown in FIG. 3, and a detection substantially equivalent to the above-mentioned case may be executed, such as an acceleration component in each direction is calculated by digital operation after the analog-to-digital conversion of a detect signal. A detecting method is not limited to the above-mentioned method, and various detections may be executed, based on the above-mentioned difference in a characteristic (resonance frequency and detectivity) between a longitudinal effect type detection unit and a lateral effect type detection unit.

In order to detect an acceleration component in each direction, a piezoelectric element is not limited to the above-mentioned two kinds of longitudinal effect type piezoelectric element and a lateral effect type piezoelectric element, and for instance, three longitudinal effect type piezoelectric elements with a vertical electrical axis to each other may be provided in order to detect an acceleration component in three directions. That is, since a sensitivity to an acceleration in a direction parallel with an electrical axis differs from a sensitivity to an acceleration in a direction vertical to an electrical axis in a longitudinal effect type piezoelectric element, an acceleration component in three directions as an unknown quantity can be calculated by an operation based on an output of three piezoelectric elements which are disposed as described. Furthermore, an acceleration component in each direction can be detected with a still higher precision as well as a wider band and a wider dynamic range can intend to be made by disposing a pair of a longitudinal effect type piezoelectric element and a lateral effect type piezoelectric element in three kinds of directions similarly.

An acceleration sensor can be made smaller easily by providing a plurality of piezoelectric elements inside a casing as described above, and it is possible to detect an acceleration component in each direction and to intend to make a wider band and a wider dynamic range based on the same principle, also by using a plurality of acceleration sensors each of which is provided inside a different casing.

What is claimed is:

1. A piezoelectric acceleration sensor comprising:
    a longitudinal effect type piezoelectric element which has a first piezoelectric body and outputs a voltage according to an expansion and contraction and a shear deformation of said first piezoelectric body;
    a lateral effect type piezoelectric element which has a second piezoelectric body and outputs a voltage according to a flexure of said second piezoelectric body; and
    a sensor substrate on which said longitudinal effect type piezoelectric element and said lateral effect type piezoelectric element are fixed, wherein under an X-Y-Z three dimensional coordinate system including an X-Y plane having the sensor substrate thereon said longitudinal effect type piezoelectric element is fixed to output a voltage according to an acceleration component in a Z-axis direction added to a voltage according to an acceleration component in an X-Y plane direction, said lateral effect type piezoelectric element fixed to output a voltage according to an acceleration component in a Z-axis direction; and
    a detecting means to output a detection signal according to an applied acceleration based on the voltage output from said longitudinal effect type piezoelectric element and said lateral effect type piezoelectric element.

2. A piezoelectric acceleration sensor according to claim 1, wherein:
    said lateral effect type piezoelectric element has one of a structure of cantilever in which an end is fixed, a structure of a fixed beam at both ends in which both ends are fixed, a structure of a double cantilever in which a center is fixed, and a structure of a diaphragm in which a periphery is fixed.

3. A piezoelectric acceleration sensor according to claim 1, further comprising a deposition substrate; wherein:
    said first piezoelectric body and said second piezoelectric body are a piezoelectric body thin film which is deposited on said deposition substrate.

4. A piezoelectric acceleration sensor according to claim 3, wherein:
    said longitudinal effect type piezoelectric element is fixed on said sensor substrate through said piezoelectric body thin film; and
    said deposition substrate functions as a weight for expanding and contracting said piezoelectric body thin film composing said longitudinal effect type piezoelectric element, according to an applied acceleration.

5. A piezoelectric acceleration sensor according to claim 3, wherein:
    a vibration body for giving a rigidity to said piezoelectric body thin film is provided on said lateral effect type piezoelectric element.

6. A piezoelectric acceleration sensor according to claim 1, wherein:

said detecting means is constituted so as to output a detection signal according to an acceleration component in a direction of causing a shear deformation in said longitudinal effect type piezoelectric element by generating a signal according to a difference in an output from said longitudinal effect type piezoelectric element and said lateral effect type piezoelectric element.

7. A piezoelectric acceleration sensor according to claim 1, wherein:

said detecting means is constituted so as to distinguish a direction of an applied acceleration by comparing an output from said longitudinal effect type piezoelectric element and said lateral effect type piezoelectric element.

8. A piezoelectric acceleration sensor according to claim 7, wherein:

said detecting means is constituted so as to decide that an acceleration in a direction of causing a shear deformation is applied on said longitudinal effect type piezoelectric element when an output from said longitudinal effect type piezoelectric element is larger than a predetermined value according to an output from said lateral effect type piezoelectric element.

9. A piezoelectric acceleration sensor according to claim 7, wherein:

said detecting means is constituted so as to decide that only an acceleration in a direction of causing a shear deformation is applied on said longitudinal effect type piezoelectric element when an acceleration is detected by only said longitudinal effect type piezoelectric element.

10. A piezoelectric acceleration sensor according to claim 1, wherein:

said detecting means is constituted so as to detect an acceleration in a frequency characteristic, into which a frequency characteristic of said longitudinal effect type piezoelectric element and a frequency characteristic of said lateral effect type piezoelectric element are compounded, by compounding an output from said longitudinal effect type piezoelectric element and said lateral effect type piezoelectric element.

11. A piezoelectric acceleration sensor according to claim 1, wherein:

said detecting means is constituted so as to detect an acceleration at a detectivity, into which a detectivity of said longitudinal effect type piezoelectric element and a detectivity of said lateral effect type piezoelectric element are compounded, by switching an output from said longitudinal effect type piezoelectric element and said lateral effect type piezoelectric element selectively.

12. A method of detecting an acceleration by using a piezoelectric acceleration sensor comprising:

a longitudinal effect type piezoelectric element which has a first piezoelectric body and outputs a voltage according to a expansion and contraction and a shear deformation of said first piezoelectric body; and a lateral effect type piezoelectric element which has a second piezoelectric body and outputs a voltage according to a flexure of said second piezoelectric body; wherein:

an applied acceleration is detected, based on an output from said longitudinal effect type piezoelectric element and said lateral effect type piezoelectric element.

13. A method of detecting an acceleration according to claim 12, wherein:

an acceleration component in a direction of causing a shear deformation in said longitudinal effect type piezoelectric element is detected according to a difference in an output from said longitudinal effect type piezoelectric element and said lateral effect type piezoelectric element.

14. A method of detecting an acceleration according to claim 12, wherein:

a direction of an applied acceleration is distinguished by comparing an output from said longitudinal effect type piezoelectric element and said lateral effect type piezoelectric element.

15. A method of detecting an acceleration according to claim 14, wherein:

it is decided that an acceleration in a direction of causing a shear deformation is applied on said longitudinal effect type piezoelectric element when an output from said longitudinal effect type piezoelectric element is larger than a predetermined value according to an output from said lateral effect type piezoelectric element.

16. A method of detecting an acceleration according to claim 14, wherein:

it is decided that only an acceleration in a direction of causing a shear deformation is applied on said longitudinal effect type piezoelectric element when an acceleration is detected by only said longitudinal effect type piezoelectric element.

17. A method of detecting an acceleration according to claim 12, wherein:

an acceleration is detected in a frequency characteristic, into which a frequency characteristic of said longitudinal effect type piezoelectric element and a frequency characteristic of said lateral effect type piezoelectric element are compounded, by compounding an output from said longitudinal effect type piezoelectric element and said lateral effect type piezoelectric element.

18. A method of detecting an acceleration according to claim 12, wherein:

an acceleration is detected at a detectivity, into which a detectivity of said longitudinal effect type piezoelectric element and a detectivity of said lateral effect type piezoelectric element are compounded, by switching an output from said longitudinal effect type piezoelectric element and said lateral effect type piezoelectric element selectively.

19. A piezoelectric acceleration sensor comprising:

a plurality of pairs of piezoelectric elements including a longitudinal effect type piezoelectric element which has a first piezoelectric body and produces a first output voltage according to an expansion and contraction and a shear deformation of the first piezoelectric body, and a lateral effect type piezoelectric element which has a second piezoelectric body and produces a second voltage output according to a flexure of the second piezoelectric body;

wherein said plurality of piezoelectric elements are located to detect acceleration components in different directions from each other.

20. A piezoelectric acceleration sensor according to claim 19, further comprising:

a detecting means for outputting a detection signal according to an acceleration component in a predetermined direction of an applied acceleration, based on an output from said plurality of pair of piezoelectric elements.

21. A piezoelectric acceleration sensor comprising:

a plurality of piezoelectric elements with a different frequency character of detecting an acceleration from each other; and a detecting means for detecting an acceleration in a frequency characteristic, into which a frequency characteristic of each of said piezoelectric elements is compounded, based on an output from said plurality of piezoelectric elements.

22. A piezoelectric acceleration sensor comprising:

a plurality of piezoelectric elements with a different detectivity of an acceleration from each other; and a detecting means for detecting an acceleration at a detectivity, into which a detectivity of each of said piezoelectric elements is compounded, based on an output from said plurality of piezoelectric elements.

* * * * *